UNITED STATES PATENT OFFICE.

JOHN J. BURCHENAL, OF CINCINNATI, OHIO, ASSIGNOR TO THE PROCTER AND GAMBLE COMPANY, OF CINCINNATI, OHIO, A CORPORATION OF OHIO.

FOOD PRODUCT.

1,135,351.                  Specification of Letters Patent.        Patented Apr. 13, 1915.

No Drawing.        Application filed November 10, 1910.    Serial No. 591,726.

*To all whom it may concern:*

Be it known that I, JOHN J. BURCHENAL, a citizen of the United States, and a resident of the city of Cincinnati, in the county of Hamilton and State of Ohio, have invented certain new and useful Improvements in Food Products, of which the following is a specification.

This invention is a food product consisting of a vegetable oil, preferably cotton-seed oil, partially hydrogenized and hardened to a homogeneous white or yellowish semi-solid closely simulating lard.

The special object of the invention is to provide a new food product for a shortening in cooking, in which the liability to become rancid is minimized, and in which the components of such vegetable oils which are inferior and detrimental to use as such a food product have been to a large extent converted into a higher and more wholesome form. All such vegetable oils contain glycerids of unsaturated fatty acids, and among these, notable quantities of fatty glycerids of lower saturation than olein. It is the presence of these glycerids of lower saturation that seriously affects the rancidity of the material. Oxidation is largely the cause of rancidity, which oxidation weakens the fat at the point of absorption at the double bonds, and these glycerids of lesser saturation readily absorb oxygen from the air at ordinary temperatures, while the more highly saturated glycerids, as olein, only absorb oxygen at elevated temperatures. It is evident, therefore, that oils or fats containing notable quantities of glycerids of linolic acid, or of lesser saturation, are distinctly inferior as an edible product to those containing a minimum of these glycerids with a larger per cent. of olein. On the other hand, while it is important to get rid of the readily oxidizable glycerids of lower saturation, it is also important not to supply too large a per cent. of fully saturated gylcerids. The saturated glycerids of the arachidic, stearic, palmitic and other groups are of very small value for shortening, inasmuch as it is the liquid fats which contribute this value to the material. Saturated fats, however, serve the purpose of congealing the shortening within the food, and thus retain it equally distributed throughout the whole. Oil, liquid at the ordinary temperatures, does not make the best shortening, because the oil remains liquid, keeping the food in a soggy condition, and the oil will even settle to the under part of the cooked product and soil the cloth, paper, or whatever it may come in contact with. Moreover, fats of a melting point above the temperature of the human body, 98° F., are not so digestible as fats which are liquid at this point, or which have a melting point below 98° F. It is, therefore, my object in the preparation of my new lard-like composition and food-product, and in preparing same from cottonseed oil, to change the chemical composition of the oil to obtain a product with a high percentage of olein, a low percentage of linolin and the lesser-saturated fats, and with only sufficient stearin to make the product congeal at ordinary temperatures.

In manufacturing this product, cotton-seed or other vegetable oil is caused to chemically absorb a limited amount of hydrogen by reacting on the oil with hydrogen in the presence of a catalytic agent and at an elevated temperature. The oil is preferably agitated in a closed vessel in the presence of an atmosphere of compressed hydrogen, a catalyser of finely-divided nickel carried by kieselguhr being maintained in suspension in the oil and its temperature being raised to about 155° C.

According to the present invention, the amount of hydrogen absorbed is carefully regulated and limited. In practice, the operation is stopped when the oil has been converted into a product which cools to a white or yellowish semi-solid more closely resembling lard than do the commercial mixtures of cotton-seed oil and animal oleo-stearin, while in many respects the product is superior to the best leaf lard as a shortening. It is not so liable to become rancid and the product can be heated to a considerably higher temperature than lard without smoking or burning. The high temperature to which my product can be raised without smoking or burning makes the product ideal for frying, inasmuch as a crust forms almost instantly on the food fried, which prevents any absorption of the shortening. A lard-like product thus prepared from cottonseed oil has a saponification value of about 195; and an iodin value ranging from about 55 to about 80. The product having an iodin value of 55 has a titer of about 42° and a melting-point of about 40° C.; that having an iodin value of 80 has a titer of about 35° and a melting-point of about 33° C. While but partially hydrogenated, containing from about 1.5% to 2.5% of additional hydrogen more than in the nonhydrogenated material, it shows no free cottonseed oil when subjected to the Halphen test, thereby differing from all commercial lard substitutes containing this oil. It contains from twenty to twenty-five per cent. of fully saturated glycerids, from five to ten per cent. linolin and from sixty-five to seventy-five per cent. olein, and an average of a number of samples gives twenty-three per cent. of saturated fats, seven and five-tenths per cent. linolin and sixty-nine and five-tenths per cent. olein, while the cottonseed oil before treatment contained seventeen per cent. saturated fats, thirty-seven per cent, linolin and forty-six per cent. olein. It will thus be seen that I have produced an ideal food product, which is high in olein, low in linolin and lesser-saturated fats, and with only enough stearin to make the product congeal at ordinary temperatures.

A lard-like composition comprising edible hydrogenized fatty oil, specifically hydrogenized vegetable oil, is claimed in my copending application Serial No. 591,727, filed November 10, 1910.

I claim:

1. A homogeneous lard-like food product consisting of an incompletely hydrogenized vegetable oil.

2. A homogeneous lard-like food product consisting of incompletely hydrogenized cottonseed oil.

3. A homogeneous lard-like food product consisting of an incompletely hydrogenized vegetable oil, said product being a semi-solid having an iodin value ranging from about 55 to about 80.

4. A homogeneous lard-like food product consisting of incompletely hydrogenized cottonseed oil, said product being a white or yellowish semi-solid having, approximately, an iodin value of 55 to 80, a melting-point of 40 to 33° C., a titer of 42 to 35° C., and giving no reaction for cotton-seed oil under the Halphen test.

5. A food product, composed of glycerids of saturated and unsaturated fatty acids in substantially the proportions of from twenty to twenty-five per cent. of saturated fats, five to ten per cent. of fats of lesser saturation than olein, and sixty-five to seventy-five per cent. of fats of a saturation corresponding to that of olein.

6. A food product, composed of glycerids of saturated and unsaturated fatty acids in substantially the proportions of from twenty to twenty-five per cent. of stearin, five to ten per cent. of linolin, and sixty-five to seventy-five per cent. of olein.

7. A food product, composed of glycerids of saturated and unsaturated fatty acids in substantially the proportions of twenty-three per cent. of stearin, seven and five-tenths per cent. of linolin, and sixty-nine and five-tenths per cent. olein.

JOHN J. BURCHENAL.

Attest:
  H. G. French,
  P. B. Hedd.

DISCLAIMER 1,135,351. *John J. Burchenal*, Cincinnati, Ohio. FOOD PRODUCTS. Patent dated April 13, 1915. Disclaimer filed January 29, 1921, by the assignee, *The Procter and Gamble Company*.

Hereby enters this disclaimer—

"To that part of the claim in said specification which is in the following words, to wit:

"1. A homogeneous lard-like food product consisting of an incompletely hydrogenized vegetable oil.

"2. A homogeneous lard-like food product consisting of incompletely hydrogenized cottonseed oil."

[*Official Gazette February 22, 1921.*]